Patented May 19, 1925.

1,538,060

UNITED STATES PATENT OFFICE.

PHILIP SCHIDROWITZ, WILLIAM FELDENHEIMER, AND WALTER WILLIAM PLOWMAN, OF LONDON, ENGLAND.

MANUFACTURE OF RUBBER.

No Drawing. Original application filed May 13, 1920, Serial No. 381,179. Divided and this application filed September 3, 1921. Serial No. 498,450.

*To all whom it may concern:*

Be it known that we, Dr. PHILIP SCHIDROWITZ, WILLIAM FELDENHEIMER, and WALTER WILLIAM PLOWMAN, all subjects of the King of England, and all residing in London, England, have invented certain new and useful Improvements in the Manufacture of Rubber, of which the following is a specification.

This invention is for improvements in or relating to the manufacture of rubber.

Various substances have been used for incorporation in rubber mixings to act as fillers and for other purposes, and among such substances china-clay has been employed. In U. S. specifications, Serial Nos. 381,179 filed May 13, 1920, and 416,528 filed October 12, 1920, a process for the treatment of clay is described and it has been found that if this clay be added to rubber, the resulting rubber-mixture is improved in various ways, for example, it cures more rapidly, the breaking strain of the product and the toughness, and distensibility of the latter are increased; moreover, the degree of increase of certain of these qualities can be varied according to the particular treatment of the clay.

The clay, which is preferably a purified clay, is prepared by first suspending it in water with the aid of a deflocculator, and then drying the clay while in the deflocculated state.

The clay may be first mixed with an equal weight of water which will render it a pasty mass, and then a deflocculator added in sufficient quantity to produce fluidity, with or without increasing this addition of a deflocculator until the fluidity first produced decreases, or adding the water with the deflocculator in sufficient proportion to bring about this last condition in one operation, and then drying the clay whilst in this state, with or without first running off any supernatant liquor or a part thereof. Obviously the less water used in preparing the clay, the less there is to evaporate off afterwards and it will be found that if sufficient water is added to bring the clay to a pasty condition, this is usually enough for carrying out the process and represents approximately the minimum quantity of water which can be used.

In certain cases the clay is purified by making a suspension of it in water with a deflocculator and then adding a flocculator prior to treating it as above described with or without intermediate drying.

Heretofore, clay for mixing with rubber has been prepared merely by passing it over the mica-drags in the well-known manner. We have also prepared clay for mixing with rubber by making a suspension of it in water with a deflocculator and then throwing it down by the aid of a reagent, running off the liquor and drying it, but it is found that the markedly different qualities referred to above as produced in the rubber by the addition of clay when it is dried whilst in the deflocculated state, are not obtainable when the drying is effected after flocculation after the immediately preceding operation, although this last material has special properties superior to untreated clay for rubber mixes.

It is found that by the incorporation in a rubber mixing of china-clay prepared according to the process set forth above, a degree of toughness, strength, distensibility, curing capacity, and specific gravity, can be obtained which heretofore, if obtainable at all, has only been obtained by the introduction of a number of ingredients into the mixing. The use of a number of ingredients as in the methods at present adopted for the manufacture of rubber is complex in working, and costly if results such as are obtainable by the use of clay prepared according to this process are aimed at.

According to one method of carrying out this invention as applied to a normally settling clay, such as Fraddon china-clay, mined from Fraddon Down, Cornwall, the clay is first washed, by a known process consisting in passing it over "mica drags" in the usual manner, but instead of using water only, a solution of 1.2 parts by weight of actual sodium-carbonate (100 per cent) in 2000 parts by weight of water is employed for 100 parts, or 5 per cent by weight of clay, that is to say, a 5 per cent suspension. This carbonate solution causes a greater quantity of "mica" to be deposited on the drags than is the case when water only is employed, and the solution, with the clay in suspension in it, is then passed on to a settling-tank where it is left long enough, say 4 hours, for further deposition of the "mica"

From this tank, the solution with the clay in it is run into a depositing tank where a weak solution of commercial alum is added, in quantity sufficient approximately to neutralize the alkalinity of the solution to deposit the clay, as is commonly done with clay emulsions.

If desired, the deflocculator, that is the sodium carbonate, may be added to the suspension when it is in the tank and not whilst it is running over the "mica-drags," and after being allowed to stand therein for about 4 hours, which is not sufficient to allow a deposition of clay to occur, it may be run off into a second tank where the flocculator, that is the alum solution is added and such flocculating reagent is added slowly enough, or in such total quantity relatively to the quantity of the deflocculator as to cause flocculation or coagulation of the clay, but not rapid sedimentation.

The process thus far described, is only a means of obtaining a pure clay, and that part of the process to which the present invention relates, consists, according to this example, in deflocculating the clay, so procured by thoroughly mixing the same with an equal weight of water in the presence of 3% of anhydrous sodium carbonate by weight relatively to the weight of the water. The water is then evaporated off without the addition of any other reagent and the dry clay so obtained is ready for incorporation with the rubber. The clay particles produced in this manner will have sodium carbonate adsorbed upon them in quantity up to substantially 3% of anhydrous sodium carbonate relatively to the clay.

The amount of deflocculator to be used, can be gauged if desired by mixing the clay with an equal weight of water, which will render it pasty, and then adding just sufficient deflocculating material to make it fluid. The clay prepared with this amount of deflocculator will to some extent improve the rubber-mixture as has already been described, but if it is desired to enhance still further the various properties mentioned, or to enhance some in a greater proportion to others, then the proportion of the deflocculator can be increased until the clay begins to again thicken. In actual practice, of course, the amount of deflocculator necessary for this purpose can be ascertained on a sample, and then the whole of the deflocculator which is to be used can be added in one operation with the water when making the suspension.

The term "deflocculating reagent" or "deflocculator," as employed in this specification and the claims, is to be understood as restricted to that type of reagent which reduces the size of the particles of the material treated; in contradistinction to those reagents (of which tannin is a notable example) whose action is that of protective colloids and which do not themselves reduce the size of the particles of the material. Likewise the term "deflocculation," as used herein, is to be interpreted as appertaining to the effect produced by reagents of the former type alone, while the term "deflocculated" as used herein means that the material so qualified by this term is in that condition of dispersion produced by the action of a deflocculator. Thus, an "initially deflocculated clay" means a clay which, at one stage or another of its preparation, has been subjected to a deflocculation process.

It has been found with Fraddon clay prepared according to the known processes previously described, that if say, ¼% to 1% of sodium carbonate, for example the ordinary quality known as soda ash, be employed relatively to the weight of water (distilled), the clay thus treated is dried and when added to a rubber-mixing will accelerate the cure of the rubber and slightly increase the distensibility. If, on the other hand, a 3% to a 5% concentration be employed at which the clay is just commencing to return to the paste state, it will be found that the rubber with which this dried clay is mixed, has the rate of cure still further increased and the distensibility is greatly increased.

As an example, a rubber-mixing suitable for some purposes may be made up as follows:—

|  | Parts. |
|---|---|
| Rubber | 228 |
| Sulphur | 12 |
| The dried clay | 160 |

The mixing is worked up in the usual manner and finally vulcanized, for example by steam at 40 lbs. pressure for ½ to 3 hours according to the character of the preparation.

Instead of soda-carbonate, other deflocculators could be used, such as ammonia.

Although china-clay has been referred to throughout this specification, it will be understood that this term is used to cover any clay having similar properties though perhaps not generally known as a china-clay.

This application is a division of our prior application Serial No. 381,179 filed May 13, 1920.

What we claim as our invention and desire to secure by Letters Patent is:—

1. In the manufacture of rubber compositions, the steps consisting in incorporating with the vulcanizable rubber mixing a dry clay which has been subjected to deflocculation and then vulcanizing the mixing.

2. In the manufacture of rubber compositions, the steps consisting in incorporating with the vulcanizable rubber mixing dry clay which has been initially deflocculated with an inorganic deflocculator, and then vulcanizing the mixing.

3. In the manufacture of rubber compositions, the steps consisting in incorporating with a vulcanizable rubber mixing dry clay which has been deflocculated with a basic reagent and then vulcanizing the mixing.

4. In the manufacture of rubber compositions, the steps consisting in incorporating with a vulcanizable mixing dry clay which has been deflocculated with an alkali and then vulcanizing the mixing.

5. In the manufacture of rubber compositions, the steps consisting in incorporating with a vulcanizable rubber mixing dry clay which has been deflocculated with sodium carbonate and then vulcanizing the mixing.

6. In the manufacture of rubber compositions, the steps consisting in incorporating with a vulcanizable rubber mixing purified clay which has been initially deflocculated with an inorganic deflocculator and dried and then vulcanizing the mixing.

7. In the manufacture of rubber compositions, the steps consisting in incorporating with a vulcanizable rubber mixing the product obtained by deflocculating clay with an aqueous alkaline reagent and evaporating the clay suspension to dryness, and then vulcanizing the mixing.

8. In the manufacture of rubber compositions, the steps consisting in incorporating with a vulcanizable rubber mixing the product obtained by deflocculating clay substantially free from undeflocculable impurities with an aqueous alkaline reagent and evaporating the clay suspension to dryness and then vulcanizing the mixing.

9. In the manufacture of rubber compositions, the steps consisting in incorporating with a vulcanizable rubber mixing the product obtained by deflocculating clay with aqueous sodium carbonate and evaporating the clay suspension to dryness and then vulcanizing the mixture.

10. In the manufacture of rubber compositions, the steps consisting in incorporating with the vulcanizable rubber mixing initially deflocculated dry clay having adsorbed upon it an inorganic deflocculator in substantially the proportion requisite for deflocculating the clay.

11. A vulcanized rubber composition containing clay which prior to addition to the rubber mixing has been dried while in the deflocculated state.

12. A vulcanized rubber composition containing clay which prior to addition to the rubber mixing has been deflocculated by aid of sufficient alkaline deflocculator to bring about incipient fflocculation and dried while in the said state.

13. A vulcanized rubber composition containing clay of particles of the reduced dimensions produced by a deflocculation treatment.

14. A vulcanized rubber composition containing clay of particles of the reduced dimensions produced by a deflocculation treatment of the clay, said particles having adsorbed upon them an inorganic deflocculator.

15. A vulcanized rubber composition containing clay of particles of the reduced dimensions produced by a deflocculation treatment of the clay, said particles having an alkali adsorbed upon them.

16. A vulcanized rubber composition containing clay of particles of the reduced dimensions produced by a deflocculation treatment of the clay, said particles having sodium carbonate adsorbed upon them.

17. A vulcanized rubber composition containing clay of particles of the reduced dimensions produced by a deflocculation treatment and substantially free from non-deflocculable impurities of clay.

18. A vulcanized rubber composition containing clay of particles of the reduced dimensions produced by a deflocculation treatment of the clay and substantially free from non-deflocculable impurities of clay, said clay particles having an alkali adsorbed upon them.

19. A vulcanized rubber composition containing clay of particles of the reduced dimensions produced by a deflocculation treatment of the clay and substantially free from non-deflocculable impurities of clay, said clay particles having sodium carbonate adsorbed upon them.

20. A vulcanized rubber composition containing clay of particles of the reduced dimensions produced by a deflocculation treatment of the clay and substantially free from non-deflocculable impurities of clay, said clay particles having an alkali absorbed upon them in quantity substantially within the proportion requisite for deflocculating the clay.

21. A vulcanized rubber composition containing clay of particles of the reduced dimensions produced by a deflocculation treatment of the clay and substantially free from non-deflocculable impurities of clay, said clay particles having sodium carbonate adsorbed upon them in quantity up to substantially 3% of anhydrous sodium carbonate relatively to the clay.

22. A vulcanized rubber composition containing clay which, prior to addition to the rubber mixing, has been dried in the deflocculated state, the particles of said clay having an inorganic deflocculator adsorbed upon them.

23. A vulcanized rubber composition containing clay which, prior to addition to the rubber mixing, has been dried while in the deflocculated state, the particles of said clay having an inorganic deflocculator adsorbed upon them in quantity substantially within the proportions requisite for deflocculating the clay.

24. A rubber composition containing clay which, prior to addition to the rubber mixing, has been purified, deflocculated with an inorganic deflocculator and dried while in the deflocculated state.

25. A rubber composition containing clay which, prior to addition to the rubber mixing, has been purified by a deflocculation process with an inorganic deflocculator, redeflocculated and dried while in this state.

26. A rubber composition containing clay which, prior to addition to the rubber mixing, has been purified by a deflocculation process, redeflocculated by aid of an alkaline deflocculator, and dried while in the deflocculated state.

27. A rubber composition containing clay which, prior to addition to the rubber mixing, has been purified by a deflocculation process, redeflocculated by aid of sodium carbonate, and dried while in the deflocculated state.

28. A rubber compostion containing clay, which prior to addition to the rubber mixing, has been purified by a deflocculation process, flocculated, redeflocculated by aid of an alkaline deflocculator, and dried while in the deflocculated state.

29. A rubber composition containing clay which, prior to addition to the rubber mixing, has been deflocculated by aid of sufficient alkaline deflocculator to bring about incipient gelation and dried while in the so deflocculated state.

30. In the manufacture of rubber compositions, the steps consisting in incorporating with the vulcanizable rubber mixing a clay which has been dried in a deflocculated condition.

31. In the manufacture of rubber compositions, the steps consisting in deflocculating a clay, drying the clay in the deflocculated state, adding the clay to a vulcanizable rubber mixing and then vulcanizing the mixing.

32. In the manufacture of rubber compositions, the steps consisting in deflocculating a clay, adding such deflocculated clay to a vulcanizable rubber mixing and then vulcanizing the mixing.

33. In the manufacture of rubber compositions, the steps consisting in incorporating with the vulcanizable rubber mixing the product obtained by deflocculating clay and evaporating the clay suspension to dryness and then vulcanizing the mixing.

34. A vulcanized rubber composition containing an initially deflocculated clay.

35. In the manufacture of rubber compositions, the steps consisting in deflocculating a clay, adding the clay to a vulcanizable rubber mixing and then vulcanizing the mixing.

PHILIP SCHIDROWITZ.
WILLIAM FELDENHEIMER.
WALTER WILLIAM PLOWMAN.